(12) United States Patent
Francois

(10) Patent No.: US 8,469,070 B2
(45) Date of Patent: Jun. 25, 2013

(54) TIRE CAPABLE OF RUNNING IN SPITE OF BEING PUNCTURED, AND METHOD FOR MANUFACTURING IT

(75) Inventor: Olivier Francois, Thuret (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 301 days.

(21) Appl. No.: 12/743,346

(22) PCT Filed: Nov. 14, 2008

(86) PCT No.: PCT/EP2008/009655
§ 371 (c)(1),
(2), (4) Date: Apr. 11, 2011

(87) PCT Pub. No.: WO2009/062736
PCT Pub. Date: May 22, 2009

(65) Prior Publication Data
US 2011/0284142 A1 Nov. 24, 2011

Related U.S. Application Data

(60) Provisional application No. 61/067,019, filed on Feb. 25, 2008.

(30) Foreign Application Priority Data

Nov. 16, 2007 (FR) ...................................... 07 08069

(51) Int. Cl.
*B60C 5/00* (2006.01)
*B60C 5/02* (2006.01)
*B60C 5/20* (2006.01)

(52) U.S. Cl.
USPC ......... 152/331.1; 152/450; 152/502; 152/548

(58) Field of Classification Search
USPC .................... 152/548, 502, 450, 339.1, 331.1
See application file for complete search history.

(56) References Cited

U.S. PATENT DOCUMENTS

| | | |
|---|---|---|
| 616,516 A | 12/1898 | Wilson |
| 3,004,579 A | 10/1961 | Hutch |
| 3,018,813 A | 1/1962 | Koch et al. |
| 3,112,790 A | 12/1963 | Fredrick |
| 4,293,017 A | 10/1981 | Lambe |
| 6,112,790 A | 9/2000 | Hsiao |

FOREIGN PATENT DOCUMENTS

| | | |
|---|---|---|
| DE | 10025079 | * 11/2001 |
| FR | 537859 | 5/1922 |

(Continued)

*Primary Examiner* — Justin Fischer
(74) *Attorney, Agent, or Firm* — Cozen O'Connor

(57) ABSTRACT

A tire configured to be mounted on a mounting rim, comprising two beads, a crown comprising a tread, two sidewalls, a carcass reinforcing armature, and a membrane situated radially on the inside of the carcass reinforcing structure, this membrane comprising: (a) a membrane reinforcing armature anchored in each bead to the annular reinforcing structure, said membrane comprises a layer of reinforcement elements directed substantially radially and (b) an airtight layer of rubber mix; wherein the membrane is arranged in such a way that part of the membrane together with part of the carcass reinforcing armature delimits a chamber extending transversely and circumferentially; wherein, in any radial section, the curved length Lm of the trace of the surface of the chamber delimited by the membrane is greater than the curved length Lc of the trace of the surface chamber delimited by the carcass reinforcing armature (Lm>Lc).

12 Claims, 3 Drawing Sheets

FOREIGN PATENT DOCUMENTS

| | | | |
|---|---|---|---|
| GB | 735882 | | 8/1955 |
| GB | 1294622 | | 11/1972 |
| JP | 4-5030 | * | 1/1992 |
| JP | 4-368203 | * | 12/1992 |
| JP | 6-72103 | * | 3/1994 |
| JP | 11-248586 | * | 9/1999 |

* cited by examiner

TIRE CAPABLE OF RUNNING IN SPITE OF BEING PUNCTURED, AND METHOD FOR MANUFACTURING IT

RELATED APPLICATIONS

This application is a U.S. national stage under 35 USC §371 of application No. PCT/EP2008/009655 filed Nov. 14, 2008.

This application claims the priority of French application no. 07/08069 filed Nov. 16, 2007 and U.S. provisional application No. 61/067,019 filed Feb. 25, 2008, the entire content of both of which are hereby incorporated by reference.

FIELD OF THE INVENTION

The present invention relates to tires capable of operating even when punctured. It relates more specifically to double chamber tires and to tires comprising means for sealing any puncture that the tire might suffer.

BACKGROUND

A tire puncture—that is to say a hole in a tire, the effect of which is that inflation gas escapes and the tire loses inflation pressure—is one of the most troublesome kinds of damage experienced by tire users. If the loss of pressure is great, it may force the tire user to replace the tire on the spot, in order to avoid damaging the tire or even the vehicle fitted with the tire. Depending on the circumstances, this need to replace the tire without delay may prove dangerous (for example when the puncture occurs on a very busy road with no hard shoulder) or penalizing (for example, during a motor race).

Confronted with this very long-standing problem, tire manufacturers have developed a broad spectrum of solutions. Among the oldest solutions are, in particular, tires with double chambers, which have two non-communicating chambers each of which can be inflated. When one of the chambers is punctured but not the other, the tire does not fully deflate, thus allowing continued running "in degraded mode", i.e. the tire can still run, but its running performance is inferior to the performance obtained when the tire is inflated to its service pressure. By way of example of this type of solution, mention may be made of U.S. Pat. No. 2,874,744, U.S. Pat. No. 3,018,813, U.S. Pat. No. 3,025,902 and U.S. Pat. No. 3,901,750. However, these solutions have the disadvantage of being very complicated to manufacture and have not found widespread use.

More recently, it has been proposed that use be made of structures capable of running without any inflation pressure, such as, for example, self-supporting tires like the one described in U.S. Pat. No. 6,688,354. Unfortunately, the reinforcing of the sidewalls of these tires generally has the consequence that other performance aspects of the tire are penalized, e.g. the rolling resistance of the tire or the ride comfort may be degraded even when running at normal pressure. In other words, the performance of the tire during "normal running" (that is to say when the tire is running inflated at its service pressure) is penalized in order to allow an improvement in performance when running "in degraded mode" even though this second running mode is the exception and may never even be experienced throughout the life of the tire.

This difficulty is overcome by another solution in which the tire is provided with internal supports which support the tread when the tire inflation pressure drops. The Pax System™ developed by Michelin (see, for example, U.S. Pat. No. 5,787,950) is a well known example of this technology. Its disadvantage lies in that it requires special tooling to fit the tire and in that it increases the weight of the tire-wheel assembly.

Yet another approach, which has found application particularly in the field of motor sport, has been to use a foam support which is compressed when the tire is inflated but which expands as the inflation pressure decreases, to the point where it fills the interior of the tire and bears some of the load thereof (see, for example, U.S. Pat. No. 3,426,821). This technology has the advantage of allowing use under extreme conditions, but it has the disadvantage of being relatively complicated to fit.

Finally, it is known to apply sealing fluids to the interior surfaces of the tire. In the event of a puncture, the fluid flows towards the hole in the wall of the tire and seals it U.S. Pat. No. 4,206,796 provides an example of this. One of the disadvantages with this technology lies in the fact that it is suited first and foremost to punctures near the crown of the tire and is less well suited to sidewall punctures, because the sealing fluid has a tendency, under the effect of centrifugal force, to move towards the crown and to fail to cover the interior of the sidewall. In addition, this solution is reserved rather for small punctures in the tire (typically, for holes not exceeding 5 mm in diameter).

SUMMARY OF THE INVENTION

One object of the present invention is to provide a tire capable of running even with a large puncture, thereby allowing the driver of the vehicle to cover a significant distance before having to repair or replace the tire, but without in any way degrading the performance of the tire by comparison with how it runs at its service pressure.

Another object of the invention is to provide a tire which is easy to manufacture with conventional manufacturing methods (e.g. built on a drum or on a hard core) and which can be mounted on a rim with no special difficulty.

These objects are achieved in accordance with one aspect of the invention directed to a tire configured to be mounted on a mounting rim, comprising:
  two beads, each bead comprising an annular reinforcing structure and a seat configured to come into contact with the mounting rim;
  a crown comprising a tread;
  two sidewalls, each sidewall extending between a bead and the crown;
  a carcass reinforcing armature extending from one bead to the other and anchored within each bead to the annular reinforcing structure;
  a membrane situated radially on the inside of the carcass reinforcing armature, this membrane comprising:
    a membrane reinforcing armature anchored in each bead to the annular reinforcing structure, wherein the membrane reinforcing armature comprises a layer of reinforcement elements directed substantially radially, that is to say which make an angle greater than or equal to 65° and less than or equal to 90° with respect to the circumferential direction, and
    an airtight layer of rubber mix.

The membrane is arranged in such a way that part of the membrane together with part of the carcass reinforcing armature delimits a chamber extending transversely and circumferentially, this chamber being situated radially on the inside of the carcass reinforcing armature and, to a large extent, under the crown. The chamber is filled with at least one fluid, that is to say a gas or a liquid, irrespective of its viscosity.

In any radial section, the curved length Lm of the trace of the surface of the chamber delimited by the membrane is greater than the curved length Lc of the trace of the surface of the chamber delimited by the carcass reinforcing armature (Lm>Lc). That part of the membrane which delimits the chamber is thus under little or no tension when the tire is mounted on the mounting rim and inflated to its service pressure. The tire according to the invention is capable of running even with a large puncture in the crown region and in the radially outer part of the sidewalls. This is because when these regions are punctured, the chamber situated between the carcass reinforcing armature and the membrane empties of the fluid contained by the chamber and the membrane extends into the space freed by the reduction in volume of the chamber. Thus, the membrane begins to contribute to the working of the carcass. If the puncture is very large, the membrane will eventually become taut and will bear some or all of the load previously borne by the carcass of the tire. In other words, as long as there is no substantial puncture the membrane is not made to work, which contributes to increasing its longevity. Tire performance when running at the service pressure is not degraded by the presence of the membrane and of the chamber. The tire can be mounted in absolutely the same way as a traditional tire.

It should be noted that the presence of a layer of reinforcement elements which make an angle greater than or equal to 65° and less than or equal to 90° with respect to the circumferential direction makes the membrane substantially inextensible. Therefore, the length Lm is greater than the length Lc, irrespective of the volume of matter contained in the chamber. This is a feature distinguishing the tire according to the invention from the tire disclosed in document U.S. Pat. No. 4,293,017 where the condition Lm>Lc could be attained by inflating the chamber to a great extent. In a tire according to the invention, Lm>Lc, irrespective of the volume of matter contained in the chamber.

It is preferable for Lm to be greater than or equal to 1.02·Lc. Thus, the risk of local tensioning is reduced. As a preference, Lm is less than or equal to 1.1·Lc (Lc<Lm≦1.1·Lc), and more preferentially still is less than or equal to 1.05·Lc (Lc<Lm≦1.05·Lc). This upper limit makes it possible to guarantee that the membrane really is tensioned in the event of a large puncture. As a matter of fact, if Lm is greater than 1.1·Lc, then a relatively substantial proportion of the membrane will have to extend outside the tire carcass reinforcing armature so that the membrane is tensioned. Very good results have been obtained for Lm values which satisfy the condition: 1.02·Lc≦Lm≦1.05·Lc.

According to one advantageous embodiment, the membrane reinforcing armature comprises membrane reinforcement elements and the carcass reinforcing armature comprises carcass reinforcement elements, the membrane reinforcement elements and the carcass reinforcement elements being made of textile material.

According to an alternative embodiment, the membrane reinforcing armature comprises membrane reinforcement elements made of textile material and the carcass reinforcing armature comprises metallic carcass reinforcement elements.

According to an advantageous embodiment, the layer of reinforcement elements of the membrane which make an angle greater than or equal to 65° and less than or equal to 90° with respect to the circumferential direction is anchored in each bead to the annular reinforcing structure. Thus, when the tire is punctured, the membrane starts to act like a traditional radial carcass reinforcing armature.

According to an alternative embodiment, the membrane reinforcing armature comprises a first layer of reinforcement elements and a second layer of reinforcement elements, each of these layers comprising mutually parallel reinforcement elements, the reinforcement elements of one layer crossing over those of the other layer. As a preference, the first layer of reinforcement elements and the second layer of reinforcement elements are anchored in each bead to the annular reinforcing structure. Thus, when the tire is punctured and the membrane is in operation, it works like a conventional carcass reinforcing armature of the "cross-ply" type.

According to a preferred embodiment, the first layer of reinforcement elements and the second layer of reinforcement elements are anchored in each bead to the annular reinforcing structure.

According to a particularly advantageous embodiment, the volume of the chamber formed between part of the carcass reinforcing armature and part of the membrane is at least partially filled with a sealing fluid. Thus, it is possible to combine the advantages of a double chamber tire with those of a self-sealing tire and to obtain a tire capable of responding to various types of puncture. If the damage to the sidewall or to the tread is small, the sealing fluid plugs the hole without the membrane being called upon. If, on the other hand, the tire sustains a large puncture, the sealing fluid leaves the chamber and frees up the volume of the chamber so that the membrane extends into the volume freed and begins to contribute to the operation of the carcass.

The chamber may additionally contain an inflation gas. By adapting the pressure of the inflation gas contained in the chamber it is possible to influence the condition of the membrane and, in particular, to place the membrane reinforcement elements under compression. Advantageously, the chamber contains a lubricating fluid to reduce friction between the membrane and the carcass reinforcing armature, which considerably lengthens the life of the tire when running "in degraded mode".

Alternatively, the chamber may be completely filled with sealing fluid. If the chamber is completely filled with sealing fluid, then this fluid can hardly move around even when the tire is running and a centrifugal force is present, thus making it possible to better seal any punctures that appear in the sidewalls.

According to a preferred embodiment, the radial distance Dr between the seat of one bead and the radially innermost part of the chamber ranges between 0.2 and 0.75 times the height H of the tire on the mounting rim (0.2·H≦Dr≦0.75·H), this height H being measured between the seat of the bead and the radially outermost point of the crown on the mid-plane of the tire when the tire is mounted on a mounting rim and inflated to its service pressure.

As a preference, when the tire is mounted and inflated to its service pressure, the chamber being filled with one or more fluids, the extent of the chamber, in a direction perpendicular both to the axis of rotation of the tire and to the circumferential direction, is at least 2 millimeters at every point, except perhaps at the axial ends of the chamber. Note that the "axial ends" of the chamber are to be understood to mean those regions of the chamber which are furthest from the mid-plane of the tire.

The invention also relates to a method of manufacturing a tire, in which the carcass reinforcing armature comprises carcass reinforcement elements and the membrane reinforcing armature comprises membrane reinforcement elements, wherein, prior to manufacture of the tire, the high-temperature contraction potential $CC_C$ of the carcass reinforcement elements is greater than the high-temperature contraction potential $CC_M$ of the membrane reinforcement elements.

Thus, it becomes possible very easily and on traditional tire building and curing tools, to obtain a tire according to the invention.

DETAILED DESCRIPTION OF THE DRAWINGS

Figure 1:
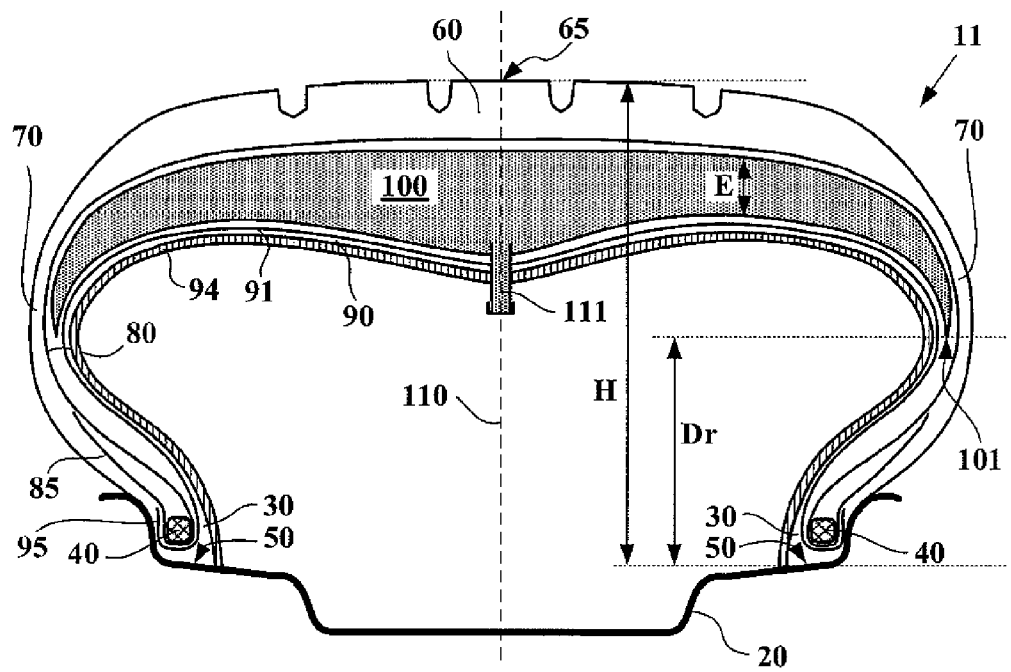
FIG. 1 depicts, in radial section, part of a tire according to an embodiment of the invention.

FIG. 1 schematically depicts, viewed in radial section, part of a tire 11 according to an embodiment of the invention mounted on a mounting rim 20. The tire 11 comprises two beads 30, each bead comprising an annular reinforcing structure 40 (here, a bead wire) and a seat 50 configured to come into contact with the mounting rim 20, a crown 60 comprising a crown reinforcing armature (not depicted) surmounted by a tread, two sidewalls 70, each sidewall 70 extending between a bead 30 and the crown 60, and a radial carcass reinforcing armature 80 comprising reinforcement elements in the form of substantially mutually parallel nylon threads. Note that in this document, the term "thread" is to be understood in a very broad sense and encompasses threads in the form of monofilaments, multifilaments, a cable, a yarn or an equivalent assembly, irrespective of the material of which the thread is made or of the surface treatment applied to encourage it to bond with the rubber or to make it stick. A thread or a reinforcing armature is said to be "radial" when the thread or the reinforcement elements of the reinforcing armature make an angle greater than or equal to 65° and less than or equal to 90° with respect to the circumferential direction.

The carcass reinforcing armature 80 extends from one bead 30 to the other. It is anchored in each bead 30 to the annular reinforcing structure, here by winding end portion 85 around the bead wire 40. The tire 11 further comprises a membrane 90. This membrane 90 comprises a membrane reinforcing armature 91 and an airtight rubber mix 94, here a butyl-based rubber mix. In the context of this document, the expression "rubber mix" denotes a rubber composition containing at least one elastomer and one filler.

The membrane reinforcing armature 91 comprises a single layer of reinforcement elements (here, nylon threads) which is anchored in each bead 30 to the annular reinforcing structure by winding end portion 95 around the bead wire 40. Its reinforcement elements are substantially radial, i.e. they make an angle greater than or equal to 65° and less than or equal to 90° with respect to the circumferential direction.

The membrane 90 is arranged in such a way that part of the membrane together with part of the carcass reinforcing armature 80 delimits a chamber 100 (i.e. parts of membrane 90 and carcass reinforcement 80 form the walls of chamber 100) extending transversely and circumferentially, this chamber 100 being situated radially on the inside of the carcass reinforcing armature 80 and, to a large extent, under the crown 60. The chamber 100 is completely filled with a self-sealing fluid such as CHS™ gel marketed by Inovex Industries Inc. A product or fluid is said to be "self-sealing" if it is capable of forming an airtight seal around the object that has punctured the membrane and of sealing the hole left by the object when this object has been removed. Self-sealing products are well known to those skilled in the art, for example from documents U.S. Pat. No. 6,837,287 and EP 0 893 236.

For the purposes of this document, a point P1 is said to be "radially inside" a point P2 (or "radially on the inside of" point P2) if it is closer to the axis of rotation of the tire than point P2. Conversely, a point P3 is said to be "radially outside" a point P4 (or "radially on the outside of" point P4) if it is further from the axis of rotation of the tire than point P4.

The embodiment depicted in FIG. 1 has a significant advantage over a conventional self-sealing tire. As a matter of fact, in this kind of tire one problem often encountered is that the sealing fluid, under the effect of centrifugal force, covers only the radially outer part of the interior of the tire. If there is a closed chamber and if this chamber is completely filled with sealing fluid, this fluid can barely move around even when the tire is running and centrifugal force is applied. If, like here, the chamber 100 is sized in such a way that it also covers part of the sidewalls 70, then the sealing fluid is forced to remain in this region. If the sidewall is punctured at the radially outer part of the sidewall 70, this puncture can be sealed.

Figure 2:
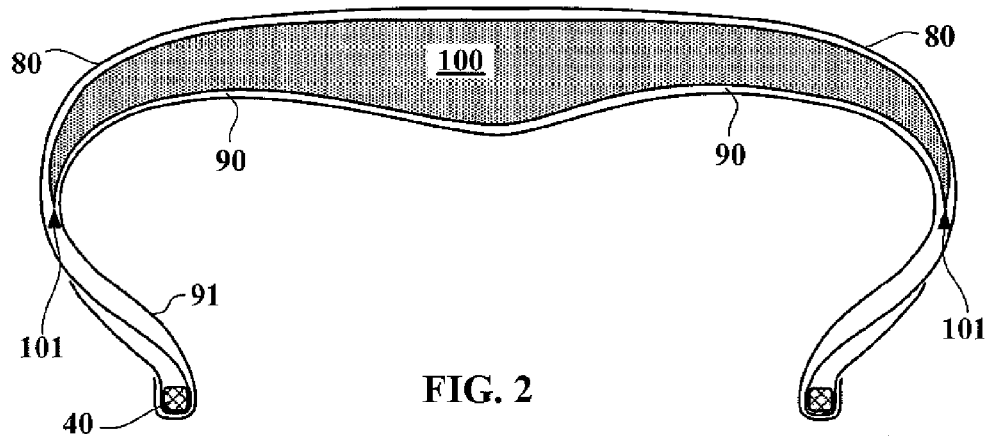
FIGS. 2 to 5 depict details of the chamber of the tire of FIG. 1 and of an alternative embodiment.
Figure 3:
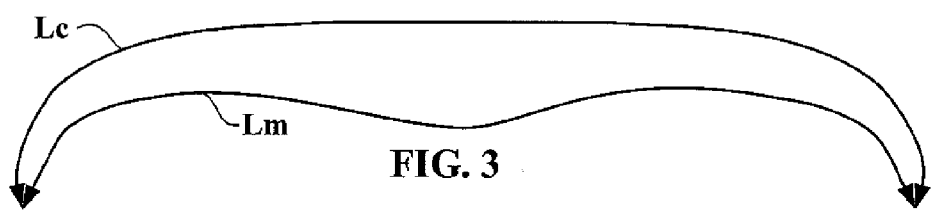

In any radial section, the curved length Lm of the trace of the chamber 100 delimited by the membrane 90 is greater than the curved length Lc of the trace of the surface of the chamber 100 delimited by the carcass reinforcing armature 80, i.e. Lm>Lc. Typically, a difference of the order of 1 to 10%, and more preferentially of 2 to 5% is aimed for. FIG. 2 depicts a detail of FIG. 1 in order to illustrate these geometric considerations. In the radial section depicted, the trace of the chamber 100 has two parts which extend between the two points 101, near the sidewalls 70, radially furthest towards the inside of the chamber. The radially outer part is delimited by the carcass reinforcing armature 80, and it has a curved length Lc (see FIG. 3). The radially inner part is delimited by the membrane 90 and has a curved length Lm (see FIG. 3). In this particular instance, the membrane is made to bulge radially inwards so that the curved length Lm is greater than the curved length Lc, e.g. Lm=1.05·Lc.

If the transition between the two parts, i.e. the radially outer part (delimited by the carcass reinforcing armature) and the radially inner part (delimited by the membrane), is continuous, so that it is not as easy as in FIGS. 1 and 2 to make the distinction between the two parts, then in order to determine Lc and Lm one should consider the two points of the chamber 100 which are radially furthest towards the inside of the chamber and lie near the sidewalls. The curved lengths Lc and Lm are measured between these two points.

Figure 4:
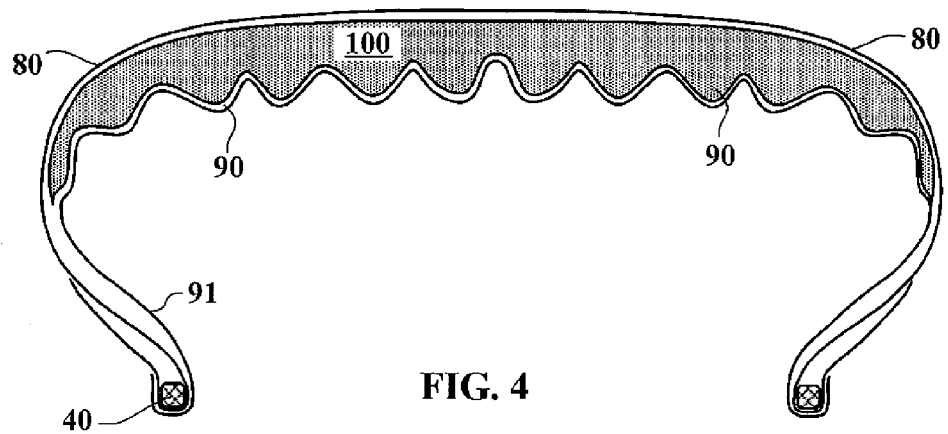
Figure 5:
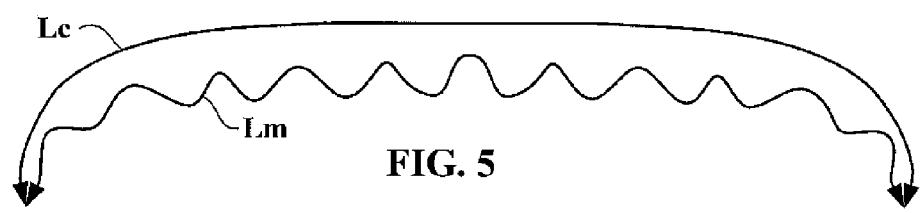

FIGS. 4 and 5 depict an alternative solution that allows the aforementioned geometric condition to be satisfied. That part of the membrane 90 which delimits the chamber does not bulge radially inwards but is corrugated, this too having the effect that the length Lm of the trace of the surface of the chamber 100 delimited by the membrane 90 is greater than the length Lc of the trace of the surface of the chamber 100 delimited by the carcass reinforcing armature 80 (see FIG. 5). The relationship in this case is Lm=1.1·Lc. For clarity, the layer of airtight rubber mix has not been depicted in FIG. 4. The corrugation of the membrane 90 as depicted in FIG. 4 has been exaggerated in order to illustrate the principle behind it.

When the crown 60 is punctured, for example by a small-diameter nail, and the nail is removed, the hole left by the nail is immediately sealed by the sealing fluid. The volume of the chamber 100 decreases accordingly by the reduction in volume of the sealing fluid and the inflation pressure of the tire, but not enough for the membrane reinforcing armature 90 to begin to contribute to the operation of the carcass. Punctures such as this can be sustained repeatedly without the membrane reinforcing armature coming into play.

By contrast, when the crown 60 (or the sidewall in the part covering the chamber 100) is torn or punctured in such a way that it has large-diameter holes (typically with diameters in excess of 5 mm), the sealing fluid escapes through the opening in the crown (or in the sidewall). As a result, the chamber empties and ultimately no longer contains any material capable, in conjunction with the carcass reinforcing armature 80, of balancing the inflation pressure. The inflation pressure of the tire then has the effect of forcing the membrane 90 to fill the space previously occupied by the chamber 100. As a consequence, it begins to contribute to the working of the carcass of the tire. This effect is applied to the full when the puncture is such that the integrity of the crown or of the sidewall is affected. At this stage, the membrane 90 becomes taut and takes over the role of the carcass.

The tire 11 is, therefore, able to provide an appropriate response to punctures of variable size, taking account of the severity of the damage with respect to the physical integrity of the crown 60 and part of the sidewall 70.

The tire 11 has the advantages of double chamber tires in so far as when an object such as a nail punctures the tread of the tire and comes to rest in the chamber 100 contained between the carcass reinforcing armature and the membrane, the tire does not fully deflate. The tire cavity (that is to say the volume between the membrane 90 of the tire 11 and the rim 20) remains pressurized. The driver of the vehicle fitted with the tire 11 can continue his journey.

However, the tire has significant advantages over known double chamber tires. In particular, it has a membrane which is significantly less taut than the carcass reinforcing armature, or is even not taut at all in the region of contact between the membrane and the chamber. In other words, the membrane 90 does no work during normal running, and this has the advantage of extending the life of the membrane, and especially of making it less vulnerable to puncturing when the tire is punctured. What is meant here by "normal running" is a mode of running in which the tire is not punctured and is inflated to its service pressure, as opposed to "running in degraded mode". In the case of the double chamber tires of the prior art, the membrane is generally under tension as soon as the tire has been inflated to its service pressure (such is the case, for example, of the tire disclosed in U.S. Pat. No. 3,901,750), thus making the membrane more sensitive to cuts and damage. Admittedly, double chamber tires are known in which the membrane is not under tension during normal running because the chamber formed between the membrane and the rim is not inflated (like the one in U.S. Pat. No. 3,087,528) but these tires need to have the emergency chamber inflated after the tire is punctured. Now, in a tire according to the invention, the membrane 90 begins to play its part following a very large puncture, without there being any need to inflate the tire.

It will also be noted that the tire 11 has a valve 111 which in particular allows the chamber 100 to be filled with sealing fluid before the tire 11 is mounted on the rim 20 and inflated to its service pressure, using a conventional tire inflation valve which has not been depicted.

Finally it should be noted that there is no need, in this embodiment, to provide a layer of airtight rubber mix (such as the rubber mix 94) in the chamber 100 because this chamber is filled only with sealing fluid and is not intended to be inflated with air.

For the tire 11, the radial distance Dr between the seat of a bead and the radially innermost part 101 of the chamber 100 is equal to 0.45 times the height H of tire on the mounting rim. (The height H is measured between the seat 50 of the bead 30 and the radially outermost point 65 of the crown 60 in the mid-plane 110 of the tire 11 when the tire is mounted on the mounting rim 20 and inflated to the service pressure). The "mid-plane" 110 of the tire is the plane normal to the axis of rotation of the tire and which lies midway between the annular reinforcing structures 40 of each bead 30. Thus, the tire 11 is protected against punctures over a not insignificant proportion of the sidewalls 70.

The size E of the chamber 100 in a direction perpendicular both to the axis of rotation of the tire and to the circumferential direction is greater than 5 mm at every point, except perhaps at the axial ends of the chamber 100.

Figure 6:
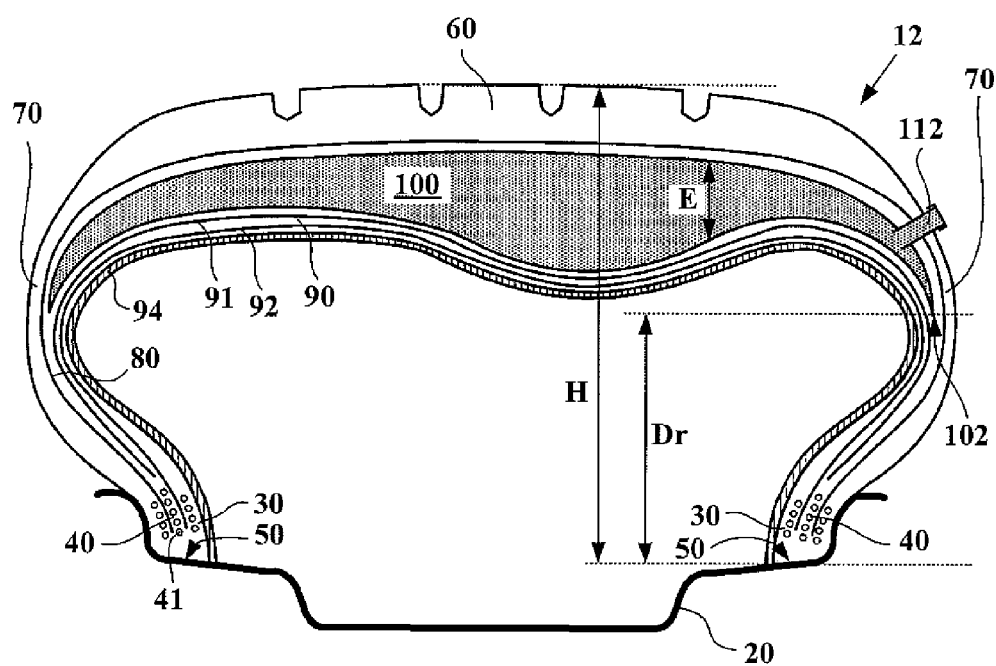
FIGS. 6 to 8 depict, in radial section, tires according to embodiments of the invention.

FIG. 6 schematically depicts, viewed in radial section, part of another tire 12 according to an embodiment of the invention. The tire 12 comprises a membrane 90 the reinforcing armature of which comprises a first layer of nylon reinforcement elements 91 and a second layer of nylon reinforcement elements 92, each of these layers having mutually parallel reinforcement elements, the reinforcement elements of one layer crossing with those of the other layer. The reinforcement elements in the first layer of reinforcement elements 91 make an angle of 45° with respect to the mid-plane 110 of the tire, those of the second layer of reinforcement elements 92 make an angle of −45°. Only the layer of reinforcement elements 92 is anchored in each bead 30 to the annular reinforcing structure 40 which in this instance is formed of a plurality of circumferential reinforcement elements 41. A tire 12 with such annular reinforcing structures has been depicted in order to illustrate that the invention is not in any way restricted to beads that have bead wires. Those of ordinary skill in the art will understand that the particular configuration of the membrane (one or more layers of reinforcement elements) and of the chamber (completely or partially filled, nature of the fluid) is independent of the kind of annular reinforcing structure.

For the tire 12, the radial distance Dr between the seat of a bead and the radially innermost part 102 of the chamber 100 is equal to 0.6 times H. The chamber 100 has a size E, in a direction perpendicular both to the axis of rotation of the tire and to the circumferential direction, that is greater than or equal to 2 mm over practically all of its axial extent. Finally, the valve 112 for filling the chamber 100 is positioned on the exterior surface of one of the sidewalls 70, which allows the chamber 100 to be inflated after the tire 12 has been inflated. Thus, the compression of the reinforcement elements of the carcass reinforcing armature can be varied. Of course, it would also have been possible to provide the same type of valve as on the tire 11 of FIG. 1.

The membrane 90 of the tire 12 of FIG. 6 bulges radially inwards. Unlike the tire 11 of FIG. 1, the chamber 100 of the tire 12 is not symmetric with respect to the mid-plane 110 (see FIG. 1) of the tire. This fact is not in any way connected with the other features of the tire 12 but is one possible alternative way of designing the chamber 100. However, except in special applications, attempts will be made to obtain a chamber 100 which is symmetric with respect to the mid-plane 110.

Figure 7:
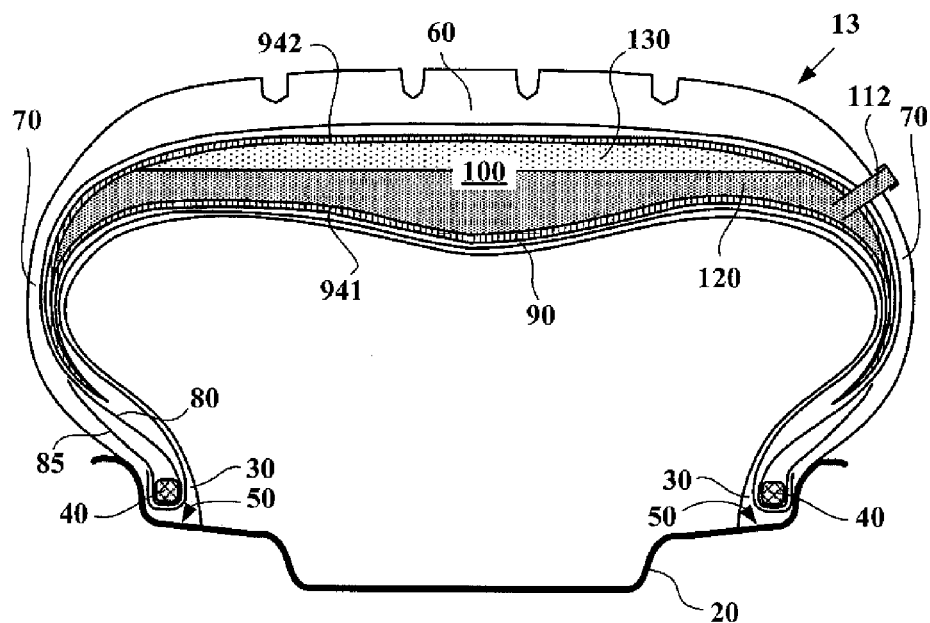

FIG. 7 schematically depicts a tire 13 according to an embodiment of the invention in which the chamber 100 is only partially filled with sealing fluid 120. The remainder of the chamber is filled with inflation gas 130 (here, air) under pressure, the inflation pressure of the chamber 100 being substantially equal to the service pressure of the tire 13. The air 130 is pressurized simply by inflating the tire 13 to its service pressure. As long as the air 130 contained in the chamber 100 is not pressurized to the inflation pressure of the tire 13, the volume of the chamber 100 decreases during inflation. This does not in any way mean that the membrane 90 begins to contribute to the work done by the carcass, provided that the sealing fluid occupies a significant enough portion of the volume of the chamber and/or provided that the amount of air 130 contained in the chamber prior to inflation of the tire 13 is enough for this quantity of air, when pressurized to the service pressure of the tire 13, to occupy a sufficiently large volume.

It should be noted that the distribution of the sealing fluid 120 and of the inflation gas 130 that has been depicted in FIG. 7 is purely schematic. The true distribution will depend in particular on the viscosity of the sealing fluid 120 and above all on the speed at which the tire is running. When the tire is running at high speed, the sealing fluid will have a tendency to occupy the radially outer part of the chamber 100.

As the chamber is configured to contain air, it is provided with a layer of airtight rubber mix 942. A second layer of airtight rubber mix 941 is applied to the membrane, but in contrast with the tire 11 of FIG. 1, on the chamber side. This arrangement results in greater ease of manufacture because the layers of airtight rubber mix are applied in succession and are not separated by other layers. Given that most airtight rubber mixes are incompatible with the other rubber mixes customarily used in tires and that it is, as far as possible, desirable to separate these rubber mixes from the other mixes, this is a considerable advantage from the manufacturing standpoint.

Figure 8:
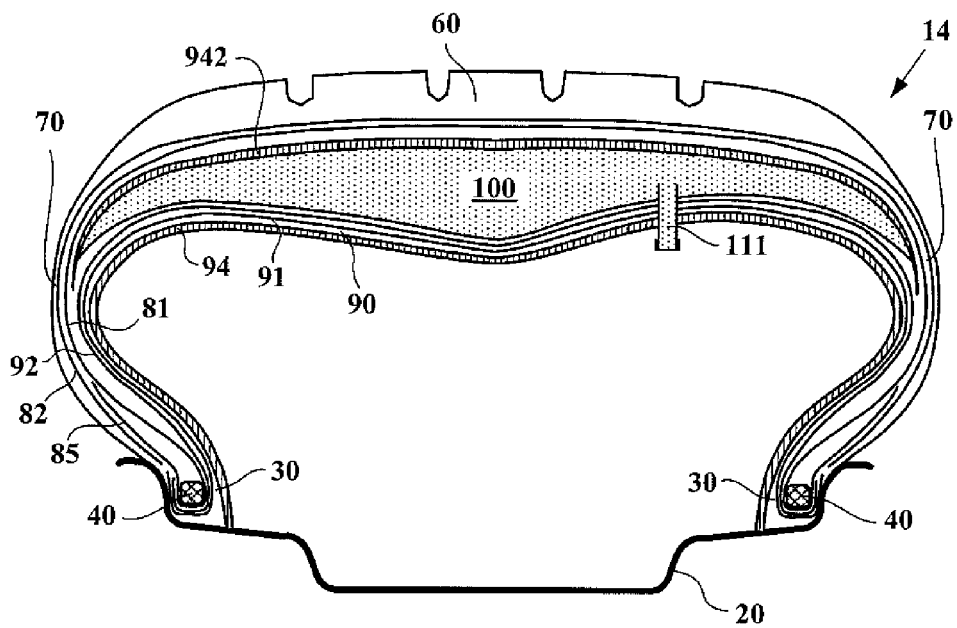

FIG. 8 schematically depicts a fourth tire 14 according to an embodiment of the invention. The carcass reinforcing armature here comprises a first layer of reinforcement elements 81 which, in each bead 30 is wound around the bead wire 40, and a second layer of reinforcement elements 82 which is, in a way known per se, superposed onto the first layer of reinforcement elements 81. The membrane 90 has a reinforcing armature which also comprises two layers of reinforcement elements 91 and 92 which are both anchored onto the bead wire 40 in each of the beads 30. The tire comprises a conventional inner liner 94 made of an airtight rubber mix. Just as was the case with the tire 13 (FIG. 7), the radially outer part of the chamber 100 is also covered with a layer 942 of airtight rubber mix. This layer 942 is needed because the chamber here is filled only with air and a small amount of lubricating liquid. By way of example, use may be made of the lubricants described in U.S. Pat. No. 2,987,093, such as silicone oils, castor oil, olive oil, etc. Before the tire 14 is mounted on the rim 20, the chamber 100 is filled with an appropriate amount of air to give the chamber its final volume when the pressure in the chamber will have reached the tire service pressure. The air is introduced into the chamber 100 through the valve 111 (which could of course have been provided on a sidewall 70 of the tire 10). Next, the tire is mounted on the rim 20 and inflated to its service pressure. If the crown of the tire is punctured, the chamber 100 empties of the air and thus allows the membrane 90 to fill the space previously occupied by the chamber 100, the consequence of this being that the membrane begins to contribute to work done by the carcass.

In general, one role of the fluid or fluids with which the chamber is filled is that of preventing the membrane 90, under the influence of the tire inflation pressure, from completely filling the space occupied by the chamber 100 and beginning to act as a second carcass. When the chamber 100 is punctured from the outside of the tire, this fluid or these fluids leave the chamber and thus cause the membrane to begin to contribute to the work of the carcass. Advantageously, the fluid is an incompressible liquid, but it may equally be a gas in sufficient quantity that, when the tire is inflated to its service pressure, the volume that the gas occupies when the pressure in the chamber 100 is identical to that of the cavity of the tire is high enough for the membrane 90 not to begin to become taut. It is also possible to inflate the tire initially (which will bring the membrane 90 into close contact with the carcass while the chamber 100 is empty) and to inflate the chamber 100 afterwards.

The present invention also relates to a method of manufacturing a tire having a structure according to the invention. It is possible to obtain a tire according to the invention using a conventional manufacturing process, such as is disclosed in U.S. Pat. No. 3,819,791, the content of which is hereby incorporated by reference. In such a process, the raw tire is inserted into a mould heated by superheated water and steam. The water circulates continuously in a membrane ("curing membrane", to be distinguished from the membrane 90 of the tire) which is inside the raw tire and which is inflated at the beginning of the curing process. As the curing membrane expands inside the tire, it pushes the tire against the hot mould walls, thus ensuring the molding of the tire tread design. Curing lasts for about 10 minutes (for ordinary tires). At the end of the curing process, the curing membrane is deflated and the tire can be taken out of the mould. Fitting the membrane 90 makes manufacture significantly more complex. Because, in any radial section, the length Lm of the trace of the surface of the chamber delimited by the membrane is greater than the length Lc of the trace of the surface of the chamber delimited by the carcass reinforcing armature (Lm>Lc), the membrane 90 may have a tendency to fold up in a poorly controlled way while the curing membrane is inflated and may, after curing, find itself fixed in an inappropriate way. This disadvantage can be avoided by at least partially curing the tire beforehand without the membrane and then vulcanizing the membrane onto it, but the need to anchor the membrane in the bead makes this alternative method laborious and technically tricky.

To avoid these disadvantages, another aspect of the present invention is directed to a tire manufacturing method whereby the carcass reinforcement elements and the membrane reinforcement elements are chosen in such a way that, prior to manufacture of the tire, the "high-temperature contraction potential" $CC_C$ of the carcass reinforcement elements is greater than the high-temperature contraction potential $CC_M$ of the membrane reinforcement elements.

What "high-temperature contraction potential" (CC) means here is the relative variation in length of a reinforcement element positioned, under a pretension of 0.2 cN/tex (remember that 1 cN/tex is equal to 0.11 gram/denier) between the plates of a heater (device of the Testrite type) set to a constant temperature of 185±0.5° C. The CS is expressed as a percentage using the following formula:

$$CC[\%] = 100 \cdot \frac{L_0 - L_1}{L_0}$$

where $L_0$ is the initial length of the reinforcement element, at ambient temperature, and $L_1$ is the length of this same reinforcement element at 185° C. The length $L_1$ is measured after the reinforcement element has stabilized at the temperature of 185° C. for 120 s±2%. For textile reinforcement elements, the high-temperature contraction potential is the consequence of the impact of all the operations that the reinforcement element has experienced during its production or its implementation.

The standard high-temperature contraction potential is usually used to characterize textile reinforcement elements but can be extended to cover metals. It should be noted that the standard high-temperature contraction potential, as defined above, will have a positive magnitude for textiles whereas in the case of metals, thermal expansion is observed when the temperature increases, leading to negative values of the standard high-temperature contraction potential as defined above.

In the context of the invention, it is important for the high-temperature contraction potential $CC_C$ of the carcass reinforcement elements to be greater than the high-temperature contraction potential $CC_M$ of the membrane reinforcement elements. This can be achieved by using appropriate textile reinforcement elements both in the carcass reinforcing armature and in the membrane reinforcing armature. Good results have been obtained using a nylon cord (2×140 tex) marketed by Yarnea (CC=10.7%) for the carcass reinforcing armature and a nylon cord (2×140 tex) marketed under the brand name "Asahi T5" (CC=3.2%) for the membrane reinforcing armature. It is also possible to satisfy the condition by using textile reinforcement elements in the carcass reinforcing armature and metal reinforcement elements in the membrane reinforcing armature. Consider the case where the carcass reinforcing armature and the membrane reinforcing armature both contain textile reinforcement elements, the high-temperature contraction potential $CC_C$ of the carcass reinforcement elements being greater than the high-temperature contraction potential $CC_M$ of the membrane reinforcement elements. When the tire is placed in the mould after it has been built and is heated to its curing temperature, of the order of 170° C., the textile reinforcement elements contract as a result of changes to their microstructure. The reinforcement elements in the carcass reinforcing armature contract more than the reinforcement elements in the membrane reinforcing armature, causing the reinforcement elements in the membrane reinforcing armature to be placed under compression. As long as the curing membrane (mentioned above) is inflated, the membrane reinforcing armature therefore finds itself trapped between the carcass reinforcing armature and the curing membrane, but as soon as the curing membrane is deflated, the membrane of the tire will have a tendency to detach itself from the carcass reinforcing armature, thus causing a chamber to be formed between the tire membrane and the carcass reinforcing armature of this tire. The chamber remains even after the tire has cooled.

A person skilled in the art will appreciate that this operation requires the prior application, during the building of the tire, of a non-stick product such as zinc stearate or silicones or an equivalent product, between the layers of material intended to form the membrane and the carcass at the location where the chamber is to be located. In the absence of any non-stick product, there is a risk that the carcass and the membrane may fuse together while the tire is being cured.

Once the chamber is formed, it is filled with the inflation gas and/or with the sealing fluid. It would theoretically be possible to inject the sealing fluid while the tire is curing, but it is preferable to do so after curing. In theory, the fluid could be injected using a syringe, but it is advantageous to provide a filling valve. This valve may be provided on the inside of the tire or on a sidewall thereof. It may be fitted before or after curing, by adhesive bonding, in the manner of a repair patch.

This method therefore makes it possible to obtain a tire according to the invention using traditional manufacturing methods, whereas the manufacture of double chamber tires of the prior art requires a multi-step manufacture or even requires the assembly of a traditional tire with an insert. Because of the difference in high-temperature contraction potential between the carcass reinforcing armature and the membrane reinforcing armature, a chamber is obtained quite naturally when the tire is cured in a traditional mould and then cooled.

It should be noted that document U.S. Pat. No. 3,004,579 already discloses a method of manufacturing a tire wherein the carcass reinforcing armature comprises carcass reinforcement elements and the membrane reinforcing armature comprises membrane reinforcement elements, and wherein, prior to manufacture of the tire, the high-temperature contraction potential of the carcass reinforcement elements is smaller than the high-temperature contraction potential of the membrane reinforcement elements. The latter are pre-stretched and, therefore, contract during curing. Of course, the resulting chamber is dimensioned such that Lm<Lc. The method of manufacturing according to the invention is distinguished from the method according to document U.S. Pat. No. 3,004,579 in that, prior to manufacture of the tire, the high-temperature contraction potential of the carcass reinforcement elements is greater than the high-temperature contraction potential of the membrane reinforcement elements. This inversion is, nevertheless, not straightforward, because those of ordinary skill in the art would have hesitated to use carcass reinforcement elements having a high-temperature contraction potential that is greater than the high-temperature contraction potential of the membrane reinforcement elements. In fact, those of ordinary skill in the art would have feared that a significant contraction of the carcass reinforcement elements during the curing process would result in a displacement of the carcass reinforcement elements or even a complete dislocation of the tire architecture in the mould.

I claim:

1. A tire configured to be mounted on a mounting rim, comprising:

two beads, each bead comprising an annular reinforcing structure and a seat configured to come into contact with the mounting rim;

a crown comprising a tread;

two sidewalls, each sidewall extending between a bead and the crown;

a carcass reinforcing armature extending from one bead to the other and anchored within each bead to the annular reinforcing structure; and a membrane situated radially on the inside of the carcass reinforcing armature, this membrane comprising:

(a) a membrane reinforcing armature anchored in each bead to the annular reinforcing structure, wherein the membrane reinforcing armature comprises a layer of reinforcement elements directed substantially radially, that is to say which make an angle greater than or equal to 65° and less than or equal to 90° with respect to the circumferential direction; and (b) an airtight layer of rubber mix;

wherein the membrane is arranged in such a way that part of the membrane together with part of the carcass reinforcing armature delimits a chamber extending transversely and circumferentially, this chamber being situated radially on the inside of the carcass reinforcing armature and, to a large extent, under the crown, the chamber being filled with at least one fluid;

wherein, in any radial section, the curved length Lm of the trace of the surface of the chamber delimited by the membrane is greater than the curved length Lc of the trace of the surface of the chamber delimited by the carcass reinforcing armature (Lm>Lc).

2. The tire of claim 1, wherein Lm is less than or equal to 1.1·Lc.

3. The tire of claim 1, wherein the carcass reinforcing armature comprises carcass reinforcement elements, the membrane reinforcement elements and the carcass reinforcement elements being made of textile material.

4. The tire of claim 1, wherein the membrane reinforcing armature comprises membrane reinforcement elements made of textile material and the carcass reinforcing armature comprises metallic carcass reinforcement elements.

5. The tire of claim 1, wherein the layer of reinforcement elements is anchored in each bead to the annular reinforcing structure.

6. The tire of claim 1, wherein the membrane reinforcing armature comprises a first layer of reinforcement elements and a second layer of reinforcement elements, each of these layers comprising mutually parallel reinforcement elements, the reinforcement elements of one layer crossing over those of the other layer.

7. The tire of claim 6, wherein the first layer of reinforcement elements and the second layer of reinforcement elements are anchored in each bead to the annular reinforcing structure.

8. The tire of claim 1, wherein the volume of the chamber formed between part of the carcass reinforcing armature and part of the membrane is at least partially filled with a sealing fluid.

9. The tire of claim 8, wherein the chamber additionally contains an inflation gas.

10. The tire of claim 1, wherein the chamber is completely filled with sealing fluid.

11. The tire of claim 1, wherein the radial distance Dr between the seat of one bead and the radially innermost part of the chamber ranges between 0.2 and 0.75 times the height H of the tire on the mounting rim ($0.2 \cdot H \leq Dr \leq 0.75 \cdot H$), this height H being measured between the seat of the bead and the radially outermost point of the crown on the mid-plane of the tire when the tire is mounted on a mounting rim and inflated to its service pressure.

12. A method of manufacturing a tire according to claim 1, wherein the carcass reinforcing armature comprises carcass reinforcement elements and the membrane reinforcing armature comprises membrane reinforcement elements, and wherein, prior to manufacture of the tire, the high-temperature contraction potential $CC_C$ of the carcass reinforcement elements is greater than the high-temperature contraction potential $CC_M$ of the membrane reinforcement elements.

\* \* \* \* \*